M. K. DUNHAM.
CUTTING TORCH.
APPLICATION FILED JAN. 18, 1919.
1,300,707.
Patented Apr. 15, 1919.
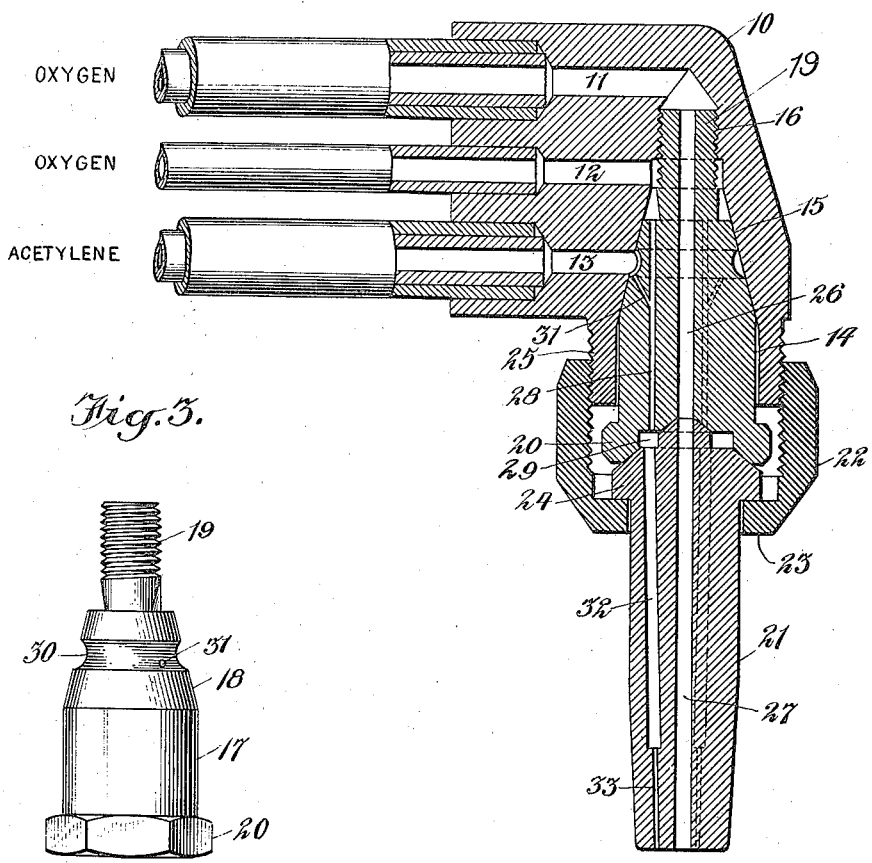
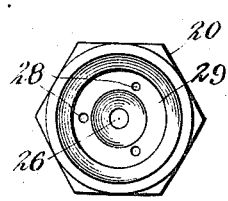
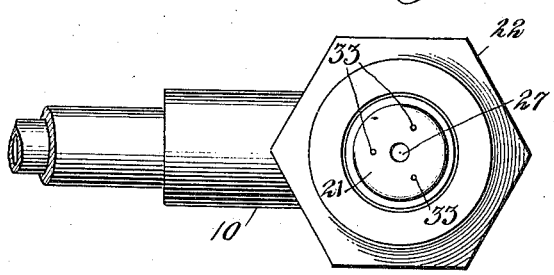
INVENTOR
Melbourne Keith Dunham
BY
ATTORNEY

UNITED STATES PATENT OFFICE.

MELBOURNE KEITH DUNHAM, OF CHICAGO, ILLINOIS.

CUTTING-TORCH.

1,300,707.  Specification of Letters Patent.  Patented Apr. 15, 1919.

Application filed January 18, 1919. Serial No. 271,814.

*To all whom it may concern:*

Be it known that I, MELBOURNE KEITH DUNHAM, a citizen of the United States, and a resident of Chicago, in the county of Cook and State of Illinois, have invented certain new and useful Improvements in Cutting-Torches, of which the following is a specification.

This invention is an improvement in cutting torches of that type in which a mixture of the combustible and combustion supporting gases is delivered to produce the main heating flame applied to the material to be cut and a separate stream of oxygen is delivered against the highly heated material to oxidize or burn a portion of the material thereby forming the cut.

In practice, the cutting tips often get very hard abuse, even much harder than the tips of welding torches, for as a rule, the operator who uses a cutting torch is not as skilful as the operator who uses the welding torch. The operator of the cutting torch will, therefore, as a rule, abuse and misuse his torch much more than will the average operator who uses a welding torch. It has been found by various manufacturers that usually the weakest point of a cutting torch, that is, the place where the most trouble occurs, is the seat for the tips. This may be partially explained on the ground that it is quite frequent to get dirt or oxid on the seat of the tip and then attempt to screw or clamp it to the head, thereby damaging the seat in or on the latter. Such damage to the seat usually requires the substitution of a new head but as most heads are silver soldered or brazed to the gas supply tubes, the repair cannot be made at the shop using the torch, and the torch has to go back to the manufacturer for a new head, which procedure involves considerable delay and expense.

Although in practice it is desirable to have a plurality of interchangeable tips adapting the cutting torch to different kinds of work requiring more or less oxygen, the interchange of tips is usually made solely to vary the size of character of the passage for the cutting oxygen and without widely changing the character, volume, or other properties of the heating mixture or the constituent gases thereof. For that reason it is not necessary to change the mixing chamber for every interchange of tips. In some cases it may be desirable to change said mixing chamber for the proper heating of widely varying articles to be cut.

The main objects of my invention are to facilitate the quick and easy interchange of tips without interchange of mixing chambers; the provision of a seat for the tip which may be readily removed and replaced in case of damage thereto; the provision of an interchangeable mixing chamber whose relationship to the head is not disturbed in the interchanging of the tips; the provision of an effective and adequate sealing seat between the mixing chamber and the several gas supply passages to prevent leakage, or the mixing of the gases at any other point than in the mixing chamber; and the provision of simple and effective means for holding the tip to its seat, which will at the same time cover, protect, and conceal the portion of the mixing chamber having a seat for the tip.

To accomplish these objects and overcome the objections above noted, I provide a construction in which the seat for the tip is independent of the head and attached thereto independently of the tip, preferably by screw threads. If the operator destroys or injures the seat, it is only necessary to unscrew it and replace it with a new one, if it is not found practicable to regrind the seat. This renewal can be made by a man of limited intelligence and it is not necessary to do any soldering or other work requiring a thorough knowledge of torch construction. The removable seat, preferably although not necessarily, also has the mixing chamber therein, so that the mixing chamber may be changed by changing the seat, although so far as certain aspects of my invention are concerned, the mixing might be back in the head itself or further back in the handle as is common in some constructions or in the tip itself.

I do not wish to be limited to any specific construction of seat, although preferably the interchangeable seat member is of substantially conical form fitting into a frusto-conical socket in the head and the seat member itself has a conical depression in its outer or base end, serving as a seat for the conical end of the tip. The two pairs of conical contact surfaces may be of the same or different angles in respect to the axis of the tip, although preferably the contact surface between the seat member and the head is very much steeper or of a lesser angle in respect to the axis than are the contact surfaces between the tip and the seat member. Thus adequate area of contact surface between adjacent passages is provided in the head and at the same time the tip which is changed more often than the seat member, has a sufficiently blunt cone, so that the possibility of spreading or expanding the seat member by any wedging action resulting from the clamping of the tip to its seat is avoided.

In the accompanying drawings, I have illustrated one embodiment of my invention, which in practice has proven very satisfactory but it will of course be evident that I do not desire to be limited to this specific construction except in so far as is defined in the appended claims.

In these drawings:

Figure 1 is a central axial section through the head and parts attached thereto.

Fig. 2 is a face view looking in the direction of the axis of the tip.

Fig. 3 is a side elevation of the seat member removed from the head, and

Fig. 4 is a face view of the base or outer end of the seat member.

In the specific construction illustrated, I provide a head member 10, having supply passages 11, 12, and 13 therein, each communicating with a corresponding separate supply pipe. These pipes extend to or from the handle of the torch as is common practice in this art. Within the head is a socket including an outer cylindrical portion 14, an intermediate frusto-conical portion 15, and an inner smaller portion 16. The passage 11, which is for the high pressure cutting oxygen, leads to the inner end of the socket, that is, to the inner end of the smaller portion 16. The other two passages 12 and 13 for the constituent gases of the mixture lead to the frusto-conical portion of the socket. As shown, one of these passages 12 leads to the inner end of the cone while the other leads to a point intermediate of the ends of the cone so that there will be adequate portions of the conical surface between the ends of the two passages 12 and 13 to form a seal.

Within the head there is employed an interchangeable seat member, preferably formed of a single piece of material, as for instance, brass, and including a cylindrical body portion adapted to loosely fit within the cylindrical portion 14 of the socket; a conical portion 18 having the same taper as and adapted to engage with the conical portion of the socket, and an inner extension 19 adapted to fit within the inner cylindrical portion 16 of the socket. Although various means may be employed for holding this seat member in position, I preferably thread the portion 16 of the head and the portion 19 of the seat member so that the seat member may be screwed into place. When the seat member is in final position, as determined by the firm and tight engagement of the co-acting cone surfaces, a portion of the seat member projects beyond the opening in the head member and this projecting portion preferably has formed integral therewith a hexagonal head 20 whereby a wrench may be readily applied in removing or replacing the seat member.

The outer or free end of the seat member has a substantially frusto-conical socket therein constituting a seat for the tip. As previously stated, the angle of this surface is preferably very much steeper in respect to the axis of the tip and head than is the co-acting conical surface between the seat member and the head.

The tip 21 which is preferably of some harder material than brass, as for instance, copper, has a frusto-conical inner end adapted to engage in and seat upon the outer end of the seat member. For holding this tip in place, various means may be employed although preferably I employ a union nut 22 having an inwardly directed flange 23 for engaging beneath a shoulder 24 on the tip and having an interiorly threaded peripheral wall for receiving a correspondingly threaded extension 25 on the head. This nut thus not only serves to draw the tip toward the head and therefore toward the seat in the seat member which is separate from the head but it also forms a casing to protect and conceal the inner end of the tip member and the outer end of the seat member. The aperture in the nut and through which the tip extends, may be slightly larger than the tip so as to permit a slight lateral movement of the tip and insure the accurate and proper seating of the tip in the seat member when the nut is tightened.

I do not wish to be limited to any specific arrangement of passages through the seat member and tip, although those illustrated are what I prefer to employ and have found most satisfactory. The seat member is shown as having a central axial passage 26 registering at one end with the cutting oxygen supply passage 11 of the head and registering at the other end with a central axial passage 27 through the tip for delivering cutting oxygen through the center of the end of the tip. The seat member is shown as also serving as an interchangeable mixing chamber. One or more (three are shown) passages 28 extend lengthwise through the seat member separate from the passage 26 and communicating at their upper ends with the passage 12 and at their lower ends with an annular chamber 29 formed in the contacting surfaces of the seat member and tip. This annular chamber may be formed solely in the seat member or solely in the tip, although it is illustrated as formed partly in each. The passages 28 at their upper end communicate with an annular passage to which the passage 12 delivers. An annular chamber 30 communicates with the passage 13 and encircles the seat member intermediate of the ends of the frusto-conical portion. This may be formed solely in the seat member or in the head or partly in both, although I have shown it solely in the seat member. From this annular passage, a plurality of passages 31 extend diagonally downwardly and inwardly into the corresponding passages 28 of the seat member. So far as the present invention is concerned, I do not wish to be limited to any particular size of passages or relative proportions or pressures of gases, although in order to prevent flashback, economize oxygen, and secure other advantages, the acetylene, if the latter be the combustible gas, is supplied through the passage 13 at a higher pressure than the oxygen, if the latter be the combustion supporting gas, is supplied through the passage 12. The passage 28 from a point above to a point below the intersecting end of the passage 31 is of uniform cross-sectional area and of approximately twice the cross-sectional area of the passage 31. The passages 32 through the tip which communicate with the chamber 29 and carry the mixture of combustible and combustion supporting gases may or may not correspond in number to the passages 28 and may if desired be of somewhat larger diameter through their upper portions, although the total cross-sectional area of all of the delivery portions 33 of the passages 32 is substantially the same or at least not materially less than the total cross-sectional areas of the passages 28 at a point directly below the point of intersection with the passages 31. This relationship of passages and gas pressures is covered in my prior and copending application, Serial No. 227,646 filed April 10, 1918. As there pointed out, the mixing may, if desired, take place in the head or back in the handle, and such may be done in a construction embodying my present invention without detracting from the advantages secured by the use of an interchangeable seat member as hereinbefore set forth.

It will of course be evident that the conical contacting surfaces above and below the groove 30 which are shown as parts of the same cone may be parts of separate parallel or non-parallel cones or of other form so long as they produce an effective seal between the gas passages. The same is true of the contacting conical surfaces above and below the groove or chamber 29 between the seat member and the tip.

Having thus described my invention what I claim as new and desire to secure by Letters Patent is:

1. In a torch, a head having a socket therein and passages leading to said socket at spaced points, an interchangeable seat member seated within said socket and having separate passages communicating with separate passages of said head and having a socket at its outer end, a tip seated in said last mentioned socket but out of engagement with said head and having separate passages communicating with separate passages of said seat member, and a collar detachably secured to said head for holding said tip in its seat.

2. In a torch, a head having a socket therein and passages leading to said socket at spaced points, a member detachably secured to said head and seated within said socket, said member having a mixing chamber or passage therein with separate inlets communicating with separate passages of said head, a tip having seating engagement with the outer end of said member but out of engagement with said head, and having a passage communicating with said mixing passage or chamber, and a collar threaded to said head for holding said tip in engagement with said member.

3. In a torch, a head having a frusto-conical socket with a threaded passage at its inner end, an interchangeable seat member having a frusto-conical portion for seating engagement in said socket and having a threaded extension at its smaller end for engagement within said passage to hold said seat member in position, and an interchangeable tip detachably secured to the outer or base end of said seat member.

4. In a torch, a head having a frusto-conical socket with a threaded passage at its inner end, an interchangeable seat member having a frusto-conical portion for seating engagement in said socket and having a threaded extension at its smaller end for engagement within said passage to hold said seat member in position, an interchangeable tip having seating engagement with the base end of said seat member, and means connecting said head and said tip for holding the latter in position.

5. In a torch, a head having a frusto-conical socket, an interchangeable seat member substantially frusto-conical in form and having a threaded portion screwed into said socket and having a conical seat in its base end, and a tip having a conical head detachably secured within said seat.

6. In a torch, a head having a socket therein, and a plurality of separate passages leading thereto at spaced points, a member detachably secured within said socket, having a passage therethrough communicating with one of the passages of the head and a mixing passage having separate communication with two of the passages of the head, a tip having seating engagement with the outer end of said member, provided with separate passages, one communicating with the first mentioned passage of said member and the other communicating with the mixing passage of said member, and a collar having threaded engagement with said head for holding said tip to its seat.

7. In a torch, a head having a socket therein and a plurality of separate passages leading thereto at spaced points, a member detachably secured within said socket, having a passage therethrough communicating with one of the passages of the head and a mixing passage having separate communication with two of the passages of the head, a tip having seating engagement with the outer end of said member, provided with separate passages, one communicating with the first mentioned passage of said member, and the other communicating with the mixing passage of said member, and threaded connections between said tip and said head for holding said tip in engagement with said member.

8. In a torch, a head having a comparatively deep narrow angled conical socket, an interchangeable seat member adapted to fit within said socket and having a comparatively shallow wide angled conical socket in its outer end co-axial with said first mentioned socket, and a tip having a conical head for seating in said last mentioned socket.

9. In a torch, a head having a frusto-conical socket, an interiorly threaded portion, an interchangeable seat member having a frusto-conical portion for engagement in said socket, and an exteriorly threaded portion for engagement with the interiorly threaded portion of the head, said member having a portion non-circular in cross section and projecting beyond said head, whereby the member may be screwed into place, and a tip detachably secured to the outer end of said member.

10. In a torch, a head having a frusto-conical socket, an interiorly threaded portion, an interchangeable seat member having a frusto-conical portion for engagement in said socket, and an exteriorly threaded portion for engagement with the interiorly threaded portion of the head, said member having a portion non-circular in cross section and projecting beyond said head whereby the member may be screwed into place, a tip seated in the outer end of said member, and a collar having threaded engagement with said head for holding said tip in position, said collar also forming a casing inclosing and concealing the outer end of said member.

11. A cutting torch, having separate supply pipes for cutting oxygen, a combustible gas and a combustion supporting gas, a head secured thereto and having separate passages communicating with said pipes, a tip having separate oxygen and heating mixture delivery passages, a seat member entirely separating said head and tip and having separate passages therethrough communicating with the passage of the head and tip, and a collar encircling said seat member and connecting said tip to said head.

12. A cutting torch having separate supply pipes for cutting oxygen, a combustible gas and a combustion supporting gas, a head secured thereto and having separate passages communicating with said pipes, a tip having separate oxygen and heating mixture delivery passages, a seat member externally coned at one end and internally coned at the other for fitting into the head and receiving the tip and having separate passages therethrough communicating with the passage of the head and tip, and means for securing said seat member to said head and independent means for securing said tip to said head.

Signed at New York city in the county of New York and State of New York this 17th day of January A. D. 1919.

MELBOURNE KEITH DUNHAM.